United States Patent
Wang et al.

(10) Patent No.: US 9,256,303 B2
(45) Date of Patent: Feb. 9, 2016

(54) TOUCH DISPLAY DEVICE AND CONTROL METHOD THEREOF

(71) Applicants: AMBIT MICROSYSTEMS (SHANGHAI) LTD., Shanghai (CN); HON HAI PRECISION INDUSTRY CO., LTD., New Taipei (TW)

(72) Inventors: Ming-Tao Wang, Shanghai (CN); Hua-Qi Wang, Shanghai (CN)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 234 days.

(21) Appl. No.: 14/093,526

(22) Filed: Dec. 2, 2013

(65) Prior Publication Data

US 2014/0168118 A1    Jun. 19, 2014

(30) Foreign Application Priority Data

Dec. 17, 2012    (CN) .......................... 2012 1 0550299

(51) Int. Cl.
*G06F 3/045*    (2006.01)
*G06F 3/0354*    (2013.01)
*G06F 3/044*    (2006.01)

(52) U.S. Cl.
CPC ............ *G06F 3/03547* (2013.01); *G06F 3/044* (2013.01); *G06F 2203/0339* (2013.01)

(58) Field of Classification Search
CPC .................... G06F 3/03547; G06F 2203/0339; G06F 3/041; G06F 3/044

USPC .................... 345/173–178; 178/18.01–18.09, 178/20.01–20.04
See application file for complete search history.

(56) References Cited

U.S. PATENT DOCUMENTS

| | | | |
|---|---|---|---|
| 7,656,393 B2 * | 2/2010 | King et al. ..................... 345/173 |
| 8,963,957 B2 * | 2/2015 | Skarulis ........................ 345/633 |
| 2006/0238517 A1 * | 10/2006 | King et al. ..................... 345/173 |
| 2013/0016123 A1 * | 1/2013 | Skarulis ........................ 345/633 |

FOREIGN PATENT DOCUMENTS

| | | |
|---|---|---|
| CN | 101853125 A | 10/2010 |
| EP | 2224323 A1 | 9/2010 |
| TW | 201044261 A1 | 12/2010 |
| TW | 201239679 A1 | 10/2012 |

* cited by examiner

*Primary Examiner* — Vijay Shankar
(74) *Attorney, Agent, or Firm* — Novak Druce Connolly Bove + Quigg LLP

(57) ABSTRACT

A touch display device includes a touch screen, a plurality of physical keys surrounding the touch screen, a touch sensor, and a touch control system. The touch screen senses a touch operation and displays a graphical user interface (GUI). The physical keys are arranged on each side of the touch screen, and the touch keys on one side can be enabled while the physical keys on all other sides are disabled. The touch sensor includes a plurality of touch sensing units which outputs a touch signal when one side is touched. The touch control system rotates the GUI through predetermined numbers of degrees to maintain uprightness for the user, enables the touch keys on the touched side, and disables the touch keys on all the other sides according to the touch signal.

15 Claims, 6 Drawing Sheets

TOUCH DISPLAY DEVICE AND CONTROL METHOD THEREOF

BACKGROUND

1. Technical Field

The present disclosure relates to a touch display device and a control method for the touch display device.

2. Description of Related Art

Many touch display devices, such as smart phones and portable computers, are arranged with a plurality of touch keys with functions such as a menu key, a home key, and a return key at a side. When the touch display device is held in a vertical display orientation, the touch keys are conveniently located for a user. However, when the touch screen is rotated to a horizontal display orientation, the touch keys are less convenient and possibly inaccessible for the user.

Therefore, what is needed is a means to overcome the above described shortcoming.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will be made to the drawings to describe various embodiments.

Figure 1:
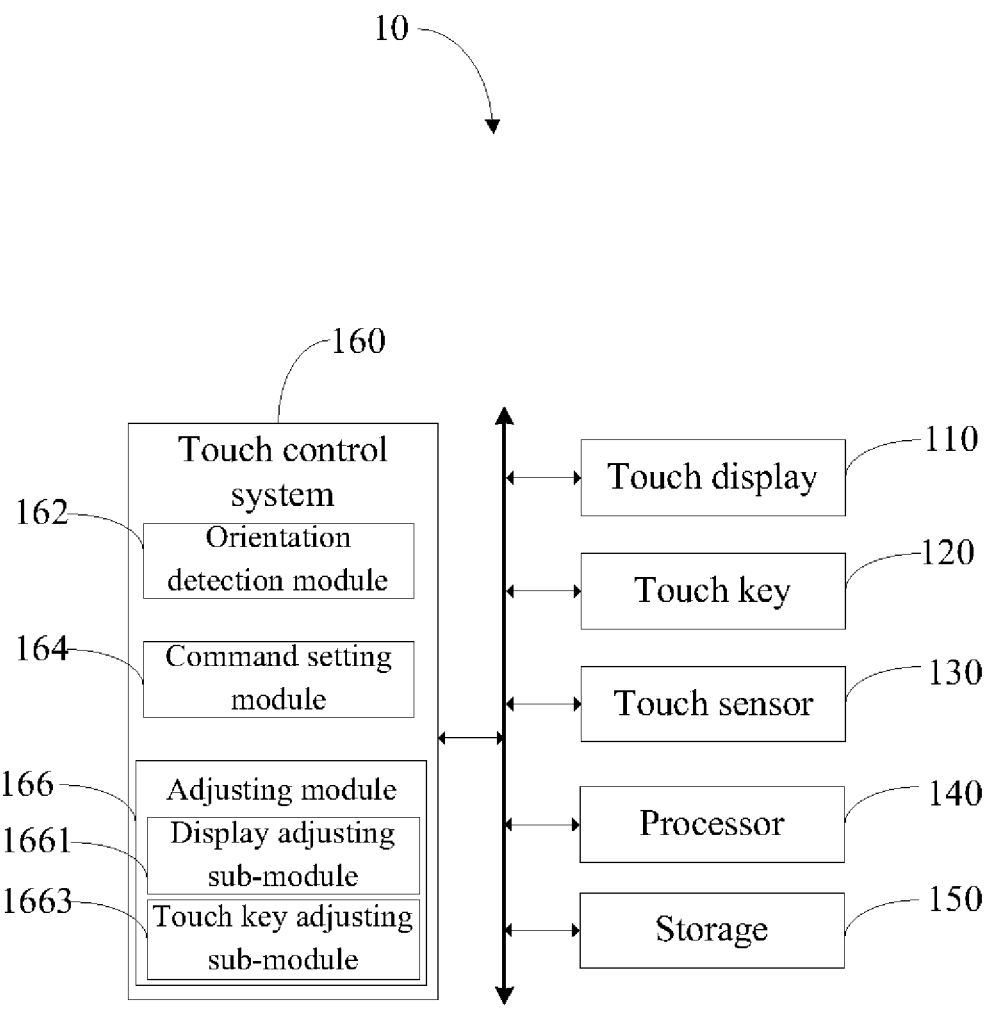
FIG. 1 is a schematic block diagram of an embodiment of a touch display device.

FIG. 1 shows a schematic block diagram of an embodiment of a touch display device 10. The touch display device 10 includes a touch screen 110, a plurality of touch keys 120 arranged on each side of the touch display device 10, a touch sensor 130, a processor 140, a storage 150, and a touch control system 160. In the embodiment, the touch display device 10 can be a smart phone, a mobile internet device (MID), or similar device. FIG. 1 is one example of the electronic device 10, and the electronic device 10 can include more or fewer components than those shown in the embodiment, or have a different configuration of the components.

Figure 2:
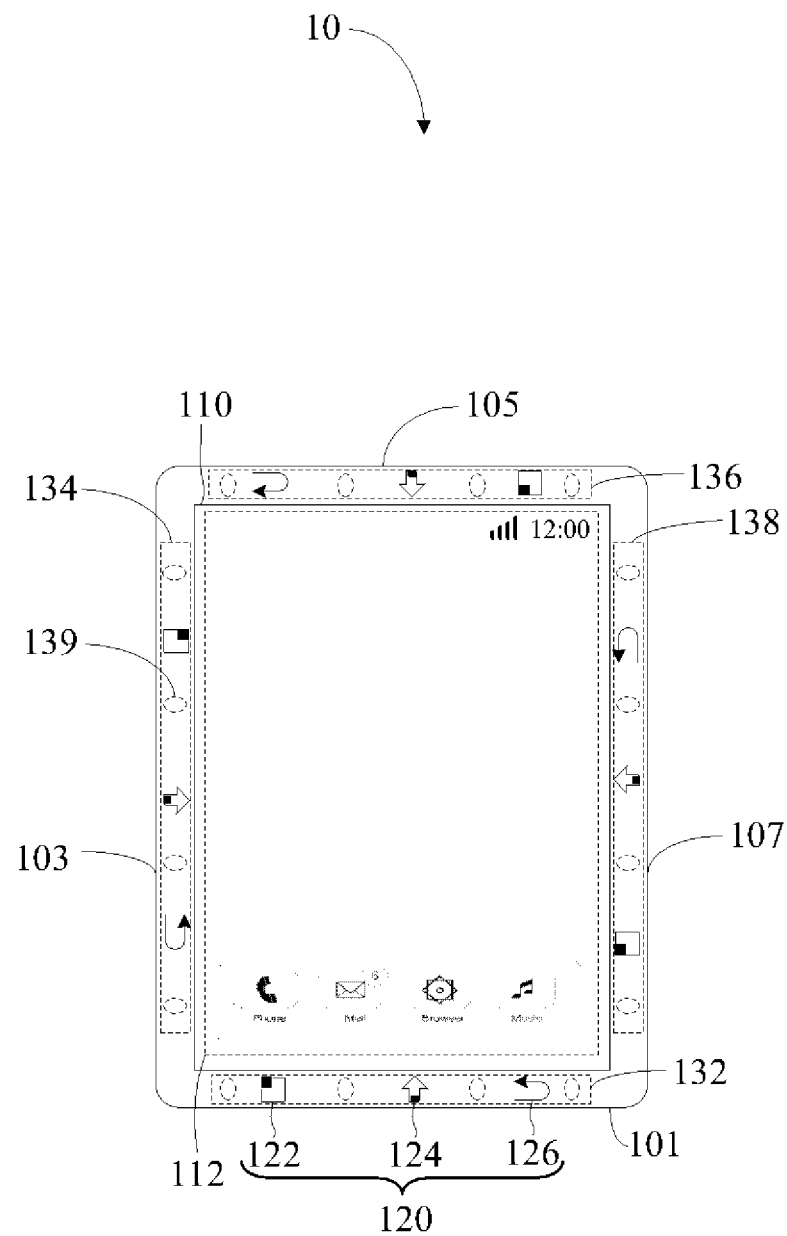
FIG. 2 is a schematic view of a plurality of touch keys and touch sensors of the touch display device of FIG. 1.

FIG. 2 shows a schematic view of the plurality of touch keys 120 and the touch sensor 130 of the touch display device 10 of FIG. 1. The touch screen 110 displays a graphical user interface (GUI) 112 and senses a touch operation applied on the touch screen 110. The touch display device 10 includes a first side 101, a second side 103, a third side 105, and a fourth side 107, surrounding four edges of the touch screen 110. The first side 101 and the third side 105 are opposite to each other and the second side 103 and the fourth side 107 are opposite to each other. A length of the first side is substantially equal to a length of the third side 105. A length of the second side is substantially equal to a length of the fourth side 107. The length of the first side is less than the length of the second side.

In the embodiment, the plurality of touch keys 120 are arranged at the first, second, third, and fourth sides 101, 103, 105, and 107. The plurality of touch keys 120 include a menu key 122, a home key 124, and a return key 126. In another embodiment, the plurality of touch keys 120 further includes a search key. Each touch key 120 can be enabled or disabled. Each touch key 120 has one LED to illuminate the touch key 120. When the touch keys 120 at a side are enabled, the corresponding LEDs are powered to illuminate the enabled touch keys 120. When one touch key 120 is touched, the touch display device 10 executes a function. At this time, the touch keys 120 at the other sides of the touch display device 10 are disabled.

The touch sensor 130 includes a first touch sensing unit 132 arranged at the first side 101, a second touch sensing unit 134 arranged at the second side 103, a third touch sensing unit 136 arranged at the third side 105, and a fourth touch sensing unit 138 arranged at the fourth side 107. Each of the first touch sensing unit 132, the second touch sensing unit 134, the third touch sensing unit 136, and the fourth touch sensing unit 138 includes a plurality of sub-touch sensing units 139. The plurality of sub-touch sensing units 139, the menu key 122, the home key 124, and the return key 126 are arranged at predetermined distances. When the first touch sensing unit 132 is touched, the first touch sensing unit 132 outputs a first touch signal. When the second touch sensing unit 134 is touched, the second touch sensing unit 134 outputs a second touch signal. When the third touch sensing unit 136 is touched, the third touch sensing unit 136 outputs a third touch signal. When the fourth touch sensing unit 138 is touched, the fourth touch sensing unit 138 outputs a fourth touch signal.

The touch control system 160 includes a plurality of programs in the form of one or more computerized instructions stored in the storage 150 and executed by the processor 140 to perform functions of the touch display device 10. The touch control system 160 detects a display orientation of the touch display device 10 and adjusts the display orientation according to the touch signal output by the touch sensor 130. Further, the touch control system 160 can enable the touch keys 120 on one side and simultaneously disable the touch keys 120 on all the other sides. In the embodiment, the touch control system 160 includes an orientation detection module 162, a command setting module 164, and an adjusting module 166. In general, the word "module", as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3A:
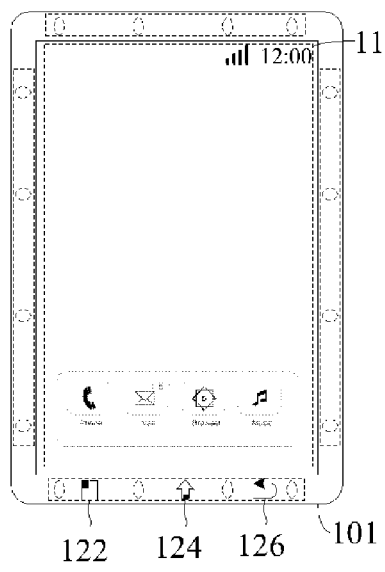
FIG. 3A shows a first display orientation of the touch display device of FIG. 1.

FIGS. 3A-3D show a schematic block diagram of different display orientations of the touch display device 10. In the embodiment, the touch display device 10 is in a vertical display orientation in an original state, as shown in FIG. 3A. The touch keys 120 on the first side 101 are enabled, and the other touch keys 120 on the other sides are disabled.

Figure 3B:
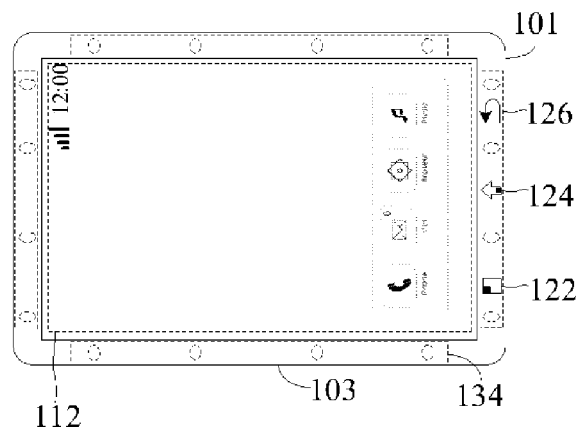
FIG. 3B shows a second display orientation of the touch display device of FIG. 1.
Figure 3C:
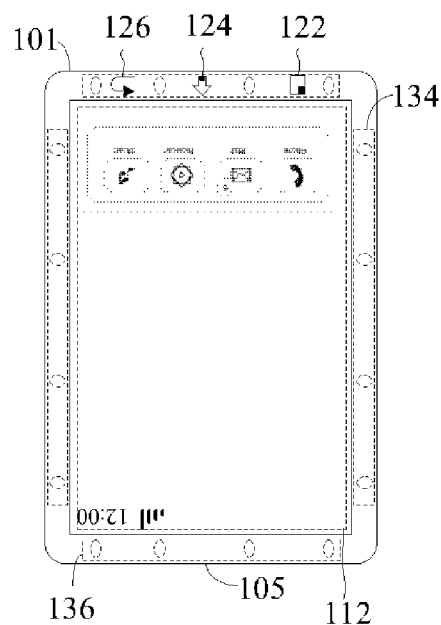
FIG. 3C shows a third display orientation of the touch display device of FIG. 1.
Figure 3D:
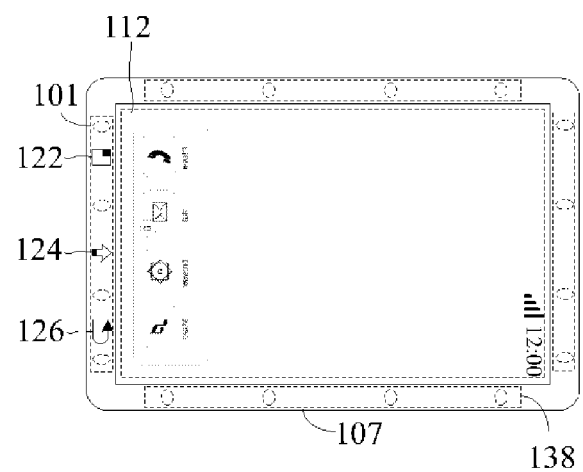
FIG. 3D shows a fourth display orientation of the touch display device of FIG. 1.

The orientation detection module 162 detects a display orientation of the touch display device 10 and outputs a detection signal according to the display orientation. In detail, the orientation detection module 162 detects the display orientation of the touch display device 10 according to the touch signal output by the touch sensor 130. When the orientation detection module 162 receives the first touch signal, the orientation detection module 162 determines that the touch display device 10 is in a first display orientation as shown in FIG. 3A, and outputs a first detection signal. When the orientation detection module 162 receives the second touch signal, the orientation detection module 162 determines that the touch display device 10 is in a second display orientation as shown in FIG. 3B, and outputs a second detection signal. When the orientation detection module 162 receives the third touch signal, the orientation detection module 162 determines that the touch display device 10 is in a third display orientation as shown in the FIG. 3C and outputs a third detection signal. When the orientation detection module 162 receives the fourth touch signal, the orientation detection module 162 determines that the touch display device 10 is in a fourth display orientation as shown in FIG. 3D and outputs a fourth detection signal.

The command setting module 164 outputs a control command according to the detection signal. For example, when the orientation detection module 162 outputs the first detection signal, the command setting module 164 does not output any control command. When the orientation detection module 162 outputs the second detection signal, the command setting module 164 outputs a first control command. In one embodiment, the first control command causes a 90 degree clockwise rotation of the GUI 112, and the enablement of the touch keys 120 on the second side 103 and the disablement of the touch keys on the first side. When the orientation detection module 162 outputs a third detection command, the command setting module 164 outputs a second control command. In the embodiment, the second control command causes a 180 clockwise degrees rotation of the GUI 112 and the enablement of the touch keys 120 on the third side 105 and the disablement of the touch keys on the first side 101. When the orientation detection module 162 outputs a fourth detection signal, the command setting module 164 outputs a third control command. In the embodiment, the third control command causes a 90 degrees counterclockwise rotation of the GUI 112, and the enablement of the touch keys on the fourth side 107 and the disablement of the touch keys on the first side 101.

The adjusting module 166 rotates the GUI 112 predetermined degrees and enables the touch keys 120 on one side of the touch display device 10 and disables the touch keys 120 on the other sides according to the control command. In detail, the adjusting module 166 includes a display adjusting sub-module 1661 and a touch key adjusting sub-module 1663. The display adjusting sub-module 1661 rotates the GUI 112 predetermined degrees according to the control command. The touch key adjusting sub-module 1663 enables the touch keys on one side and disables the touch keys 120 on the other sides according to the control command.

Figure 4:
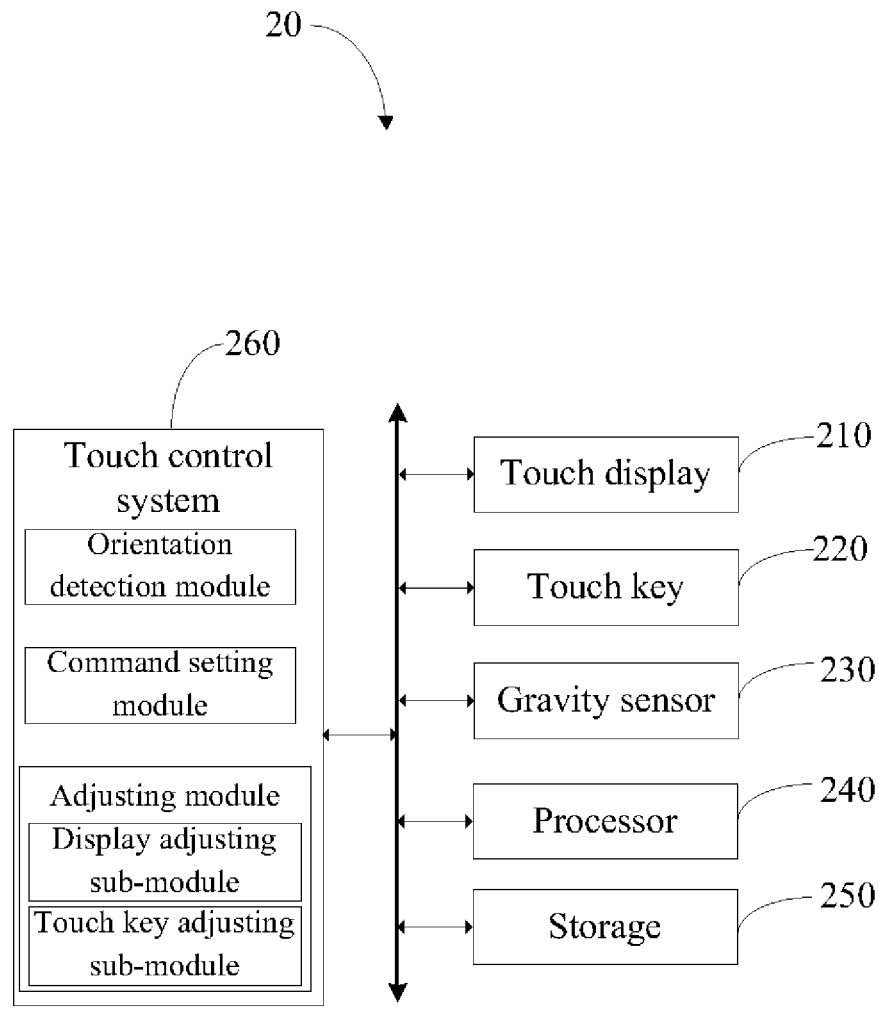
FIG. 4 is a schematic block diagram of another embodiment of the touch display device.
Figure 5:
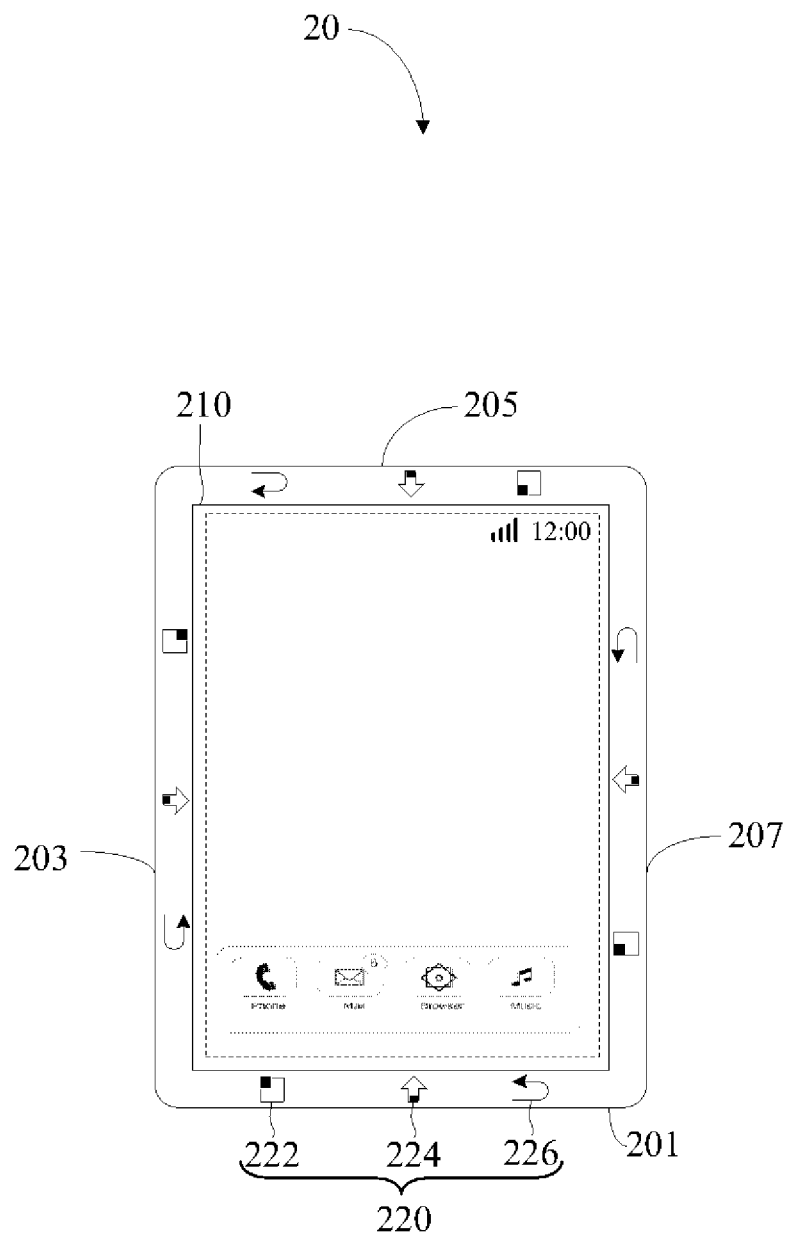
FIG. 5 is a front view of the touch display device of FIG. 4.

FIG. 4 shows a schematic block diagram of another embodiment of a touch display device 20. FIG. 5 shows a front view of the touch display device 20. The touch display device 20 is similar to the touch display device 10, except that the touch display device 20 further includes a gravity sensor 230. The gravity sensor 230 senses a display orientation of the touch display device 20 and outputs a sensing signal according to the orientation of the touch display device 20. In detail, when the touch display device 10 is working in the first display orientation as shown in FIG. 3A and the first side 201 is located beneath the GUI 112 as displayed on the display 110, the gravity sensor 230 outputs a first sensing signal. When the touch display device 10 is working in the second display orientation as shown in FIG. 3B and it is the second side 203 which is located beneath the GUI 112 as displayed on the display 110, the gravity sensor 230 outputs a second sensing signal. When the touch display device 10 is working in the third display orientation as shown in FIG. 3C and it is the third side 205 which is located beneath the GUI 112 as displayed on the display 110, the gravity sensor 230 outputs a third sensing signal. When the touch display device 10 is working in the fourth display orientation as shown in FIG. 3D, it is the fourth side 207 which is located beneath the GUI 112 as displayed on the display 110.

The manner of rotating the GUI and switching a state of the touch keys performed by a touch control system 260 is similar to the touch control system 160.

Figure 6:
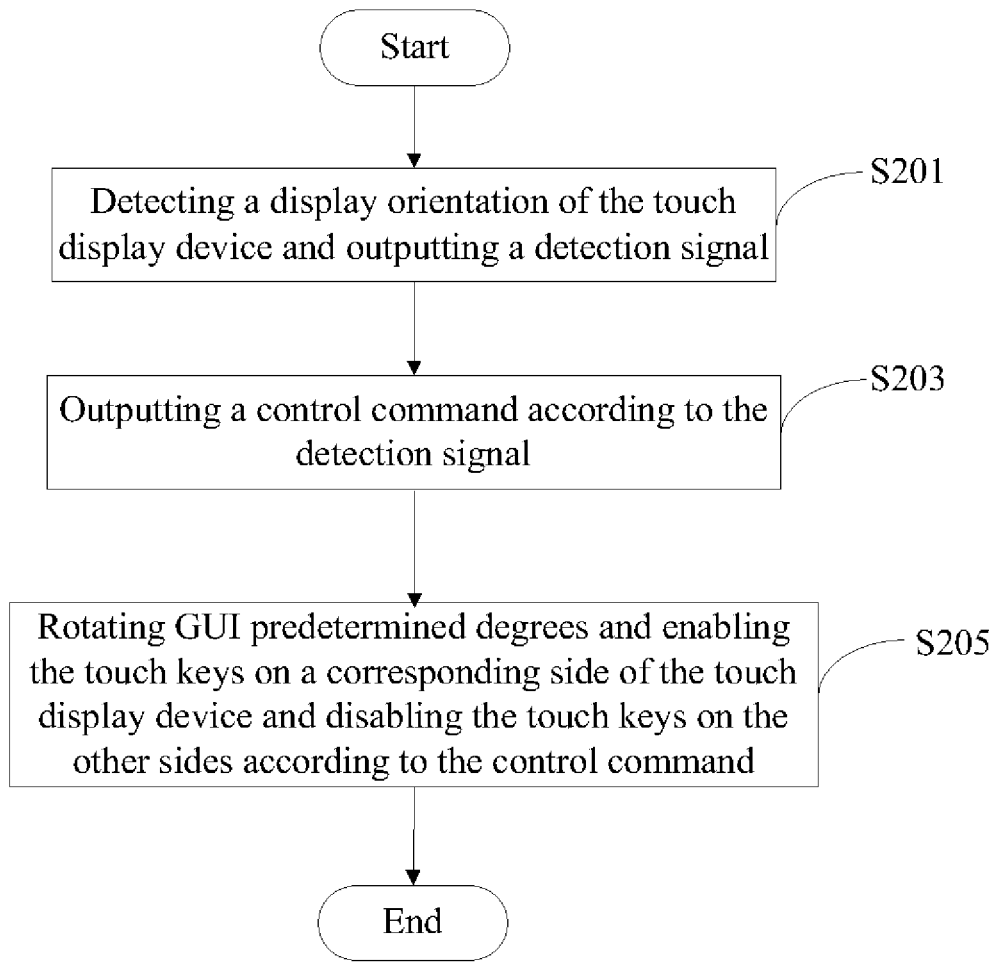
FIG. 6 is a flowchart of one embodiment of a control method of the touch display device.

FIG. 6 shows a flowchart of one embodiment of a control method implemented by the touch display device 10. The method includes the following steps, but in other embodiments additional steps may be added, others deleted, and the ordering of the steps may be changed.

In step S201, the orientation detection module 162 detects a display orientation of the touch display device 10 and outputs a detection signal. In detail, the orientation detection module 162 detects the display orientation of the touch display device 10 according to the touch signal output by the touch sensor 130. When the orientation detection module 162 receives the first touch signal, the orientation detection module 162 determines that the touch display device 10 is in a first display orientation as shown in FIG. 3A, and the outputs a first detection signal. When the orientation detection module 162 receives the second touch signal, the orientation detection module 162 determines that the touch display device 10 is in a second display orientation as shown in FIG. 3B, and outputs a second detection signal. When the orientation detection module 162 receives the third touch signal, the orientation detection module 162 determines that the touch display device 10 is in a third display orientation as shown in the FIG. 3C and outputs a third detection signal. When the orientation detection module 162 receives the fourth touch signal, the orientation detection module 162 determines that the touch display device 10 in a fourth display orientation as shown in FIG. 3D and outputs a fourth detection signal.

In step S203, the command setting module 164 outputs a control command according to the detection signal. In detail, when the orientation detection module 162 outputs the first detection signal, the command setting module 164 does not output any control command. When the orientation detection module 162 outputs the second detection signal, the command setting module 164 outputs a first control command. In one embodiment, the first control command causes a 90 degree clockwise rotation of the GUI 112, enables the touch keys 120 on the second side 103, and disables the touch keys on the first side. When the orientation detection module 162 outputs a third detection command, the command setting module 164 outputs a second control command. In the embodiment, the second control command causes a 180 degree clockwise rotation of the GUI 112, enables the touch keys 120 on the third side 105, and disables the touch keys on the first side 101. When the orientation detection module 162 outputs a fourth detection signal, the command setting module 164 outputs a third control command. In the embodiment, the third control command causes a 90 degree counterclockwise rotation of the GUI 112, enables the touch keys on the fourth side 107, and disables the touch keys on the first side 101.

In step S205, the adjusting module 166 rotates the GUI 112 through predetermined numbers of rotational degrees and enables the touch keys 120 on one side of the touch display device 10 and disables the touch keys 120 on the other sides according to control command.

In detail, the adjusting module 166 includes a display adjusting sub-module 1661 and a touch key adjusting sub-module 1663. The display adjusting sub-module 1661 rotates the GUI 112 a predetermined numbers of degrees according to the control command. The touch key adjusting sub-module 1663 enables the touch keys on one side and disables the touch keys 120 on the other sides according to the control command.

In summary, the touch display device and the control method for the touch display device can rotate the displayed GUI 112 and switch the states of the touch keys when a position of the touch display device is changed. Thus, the touch display device reduces the chance and likelihood of false operations when touching the touch keys and convenience.

It is to be understood that even though numerous characteristics and advantages of the present embodiments have been set forth in the foregoing description, with details of the structures and functions of the embodiments, the disclosure is illustrative only; and changes may be made in detail, especially in the matters of arrangement of parts within the principles of the embodiments to the full extent indicated by the broad general meaning of the terms in which the appended claims are expressed.

What is claimed is:

1. A touch display device, comprising:
   a touch screen sensing a touch operation and displaying a graphical user interface (GUI);
   a plurality of touch keys arranged on each of a plurality of sides of the touch display device;
   a touch sensor comprising a plurality of touch sensing units, each touch sensing unit being arranged at each of the sides of the touch display device, the touch sensor sensing whether one of the sides of the touch display device is touched and outputting a touch signal when the one of the sides of the touch display device is touched; and
   a touch control system rotating the GUI at predetermined degrees, enabling the touch keys on the touched side, and disabling the touch keys on the other sides of the touch display device according to the touch signal.

2. The touch display device of claim 1, wherein the touch display device has a first side, a second side, a third side opposite the first side, and a fourth side opposite the second side, a length of the first side is equal to a length of the third side, a length of the second side is equal to a length of the fourth side, and the length of the first side is less than the length of the second side; the plurality of touch keys are arranged on each of the first, second, third, and fourth side.

3. The touch display device of claim 2, wherein the touch sensor comprises a first touch sensing unit arranged at the first side, a second touch sensing unit arranged at the second side, a third touch sensing unit arranged at the third side, and a fourth touch sensing unit arranged at the fourth side.

4. The touch display device of claim 3, wherein when the first touch sensing unit is touched, the first touch sensing unit outputs a first touch signal to the touch control system; when the second touch sensing unit is touched, the second touch sensing unit outputs a second touch signal to the touch control system; when the third touch sensing unit is touched, the third touch sensing unit outputs a third touch signal to the touch control system; when the fourth touch sensing unit is touched, the fourth touch sensing unit outputs a fourth touch signal to the touch control system.

5. The touch display device of claim 4, wherein the touch keys arranged at the first side is enabled at an original state, and the other touch keys arranged at the second, third, and fourth sides are disabled at the original state.

6. The touch display device of claim 1, wherein each of the touch keys corresponds to an LED, and when a touch key is enabled, a corresponding LED is powered to illuminate the touch key.

7. The touch display device of claim 5, wherein the touch control system comprises an orientation detection module detecting a display orientation of the touch display device and outputting a detection signal according to the touch signal.

8. The touch display device of claim 7, wherein the touch control system further comprises a command setting module outputting a control command according to the detection signal.

9. The touch display device of claim 8, wherein when the orientation detection module outputs the first detection signal, the command setting module does not output any control command; when the orientation detection module outputs the second detection signal, the command setting module outputs a first control command causing a 90 degree clockwise rotation of the GUI, enabling the touch keys on the second side, and disabling the touch keys on the first side; when the orientation detection module outputs a third detection command, the command setting module outputs a second control command causing a 180 degree clockwise rotation of the GUI, enabling the touch keys on the third side, and disabling the touch keys on the first side; when the orientation detection module outputs a fourth detection signal, the command setting module outputs a third control command causing a 90 degree counterclockwise rotation of the GUI, enabling the touch keys on the fourth side, and disabling the touch keys on the first side.

10. The touch display device of claim 9, wherein the touch control system further comprises an adjusting module configured to rotate the GUI the predetermined degrees, enable the touch keys at one side of the sides of the touch display device, and disable the other touch keys according to the control command.

11. A touch display device, comprising:
    a touch screen sensing a touch operation and displaying a graphical user interface (GUI);
    a plurality of touch keys arranged on each of a plurality of sides of the touch display device;
    a gravity sensor sensing an orientation of the touch display device and outputting a sensing signal; and
    a touch control system rotating the GUI predetermined degrees, enabling the touch keys on the touched side, and disabling the touch keys on the other sides of the touch display device, according to the sensing signal.

12. A control method for a touch display device having a plurality of touch keys arranged on each of a plurality of sides of the touch display device, the control method comprising:
    detecting a display orientation of the touch display device and outputting a detection signal;
    outputting a control command according to the detection signal; and
    rotating a graphical user interface (GUI) predetermined degrees, enabling the touch keys on a corresponding side of the touch display device, and disabling the touch keys on the other sides, according to the control command.

13. The control method of claim 12, wherein the step of outputting a control command comprises:

outputting a first control command causing a 90 degree clockwise rotation of the GUI, and enabling the touch keys on the second side and disable the touch keys on the first side; outputting a second control command causing a 180 degree clockwise rotation of the GUI and enabling the touch keys on the second side and disabling the touch keys on the first side; outputting a third control command causing a 90 degree counterclockwise rotation of the GUI and enabling the touch keys on the fourth side and disabling the touch keys on the first side.

14. The control method of claim 12, further comprising:

outputting a touch signal denoting that whether one of the sides of the touch display device is touched via a plurality of touch sensors arranged on each of the sides of the touch display device, and outputting the detection signal according to the touch signal.

15. The control method of claim 12, further comprising:

outputting a sensing signal denoting that one side is located beneath the GUI by a gravity sensor, and outputting the detection signal according to the sensing signal.

* * * * *